(12) United States Patent
Pansera et al.

(10) Patent No.: US 11,541,979 B2
(45) Date of Patent: Jan. 3, 2023

(54) PLANT FOR THE TREATMENT OF WASTE WATER ON BOARD OF VESSELS

(71) Applicant: OZONO ELETTRONICA INTERNAZIONALE S.R.L., Muggiò (IT)

(72) Inventors: Mario Pansera, Bergamo (IT); Maurizio Rossi, Genoa (IT)

(73) Assignee: DE NORA WATER TECHNOLOGIES ITALY S.R.L., Milan (IT)

( * ) Notice: Subject to any disclaimer, the term of this patent is extended or adjusted under 35 U.S.C. 154(b) by 0 days.

(21) Appl. No.: 15/307,591

(22) PCT Filed: Jun. 18, 2015

(86) PCT No.: PCT/EP2015/063679
§ 371 (c)(1),
(2) Date: Oct. 28, 2016

(87) PCT Pub. No.: WO2015/193416
PCT Pub. Date: Dec. 23, 2015

(65) Prior Publication Data
US 2017/0043854 A1 Feb. 16, 2017

(30) Foreign Application Priority Data

Jun. 19, 2014 (IT) .................. BG2014A000021

(51) Int. Cl.
*B63J 4/00* (2006.01)
*C02F 1/44* (2006.01)
(Continued)

(52) U.S. Cl.
CPC ............... *B63J 4/006* (2013.01); *C02F 1/001* (2013.01); *C02F 1/441* (2013.01); *C02F 1/444* (2013.01);
(Continued)

(58) Field of Classification Search
CPC .......... C02F 2103/008; C02F 2103/002; C02F 2103/005; C02F 2201/001;
(Continued)

(56) References Cited

U.S. PATENT DOCUMENTS 4,693,819 A * 9/1987 Piepho ............... B01D 21/0018
210/202
5,578,213 A * 11/1996 Miller ................... B01D 17/00
210/259

(Continued)

FOREIGN PATENT DOCUMENTS

GB 2292532 A 2/1996
WO WO-2013129159 A1 * 9/2013 ......... B01D 17/0205

OTHER PUBLICATIONS

Salsnes Filter AS (Product Brochure, Salsnes Filter AS, 2017). (Year: 2017).*
(Continued)

*Primary Examiner* — Ryan B Huang
(74) *Attorney, Agent, or Firm* — Lucas & Mercanti, LLP

(57) ABSTRACT

A plant for the treatment of waste water on board of vessels having a collection tank of black water and grey water, a primary treatment unit including a band filter, a secondary treatment unit including a micro-filtration or ultra-filtration module and a tertiary treatment unit including an ozone treatment module is provided.

7 Claims, 1 Drawing Sheet

(51) Int. Cl.
*C02F 1/78* (2006.01)
*C02F 9/00* (2006.01)
*C02F 1/00* (2006.01)
*C02F 103/00* (2006.01)
*C02F 1/72* (2006.01)
*C02F 1/32* (2006.01)

(52) U.S. Cl.
CPC .................. *C02F 1/78* (2013.01); *C02F 9/00* (2013.01); *C02F 1/004* (2013.01); *C02F 1/32* (2013.01); *C02F 1/72* (2013.01); *C02F 2103/002* (2013.01); *C02F 2103/005* (2013.01); *C02F 2201/001* (2013.01)

(58) Field of Classification Search
CPC ............ C02F 2201/008; C02F 2201/00; C02F 2201/002; C02F 2201/006; C02F 2201/007; C02F 2201/78; C02F 2201/782; B63J 4/006

See application file for complete search history.

(56) References Cited

U.S. PATENT DOCUMENTS

| | | | | |
|---|---|---|---|---|
| 5,906,752 | A * | 5/1999 | Williams | B01D 46/22 210/400 |
| 6,074,551 | A * | 6/2000 | Jones | B01D 61/025 210/106 |
| 6,942,786 | B1 * | 9/2005 | Fosseng | B01D 33/04 210/97 |
| 2006/0011525 | A1 * | 1/2006 | Hoffjann | C02F 9/00 210/136 |
| 2007/0068879 | A1 * | 3/2007 | Markle | C02F 9/00 210/760 |
| 2007/0114182 | A1 * | 5/2007 | DePoli | C02F 3/1215 210/703 |
| 2007/0199868 | A1 * | 8/2007 | Volpe | C02F 1/463 210/143 |

OTHER PUBLICATIONS

International Search Report for International Application No. PCT/EP2015/063679 (2 Pages) (dated Sep. 28, 2015).

International Preliminary Report on Patentability for International Application No. PCT/EP2015/063679 (12 Pages) (dated Aug. 16, 2016).

* cited by examiner

PLANT FOR THE TREATMENT OF WASTE WATER ON BOARD OF VESSELS

This application is a U.S. national stage of PCT/EP2015/063679 filed on Jun. 18, 2015 which claims the benefit of priority from Italian Patent Application No. BG2014A000021 filed Jun. 19, 2014 the contents of each of which are incorporated herein by reference.

FIELD OF THE INVENTION

The present invention relates to water treatment, in particular for the treatment of waste water on board of vessels.

BACKGROUND OF THE INVENTION

The invention relates to the treatment of waste water on board of boats and ships, being directed in particular to providing passenger ships, ferries, off-shore rigs or barges with means with purifying water in order to either reuse the water for various purposes or to effect the subsequent outboard discharge in compliance with international standards and local regulations.

A reference value for the typical average daily consumption of drinking water on cruise ships is 247 litres per person, producing:

- Black water: 25.5 l/p/d (litres/person/day) with an organic load (BOD) of 51 g/p/d (grams/person/day) and with a load of solids (TSS) of 38 g/p/d.
- Grey water coming from housings: 112.2 l/p/d, with an organic load (BOD) of 22 g/p/d, and with a load of solids (TSS) of 11 g/p/d.
- Grey water coming from the laundries: 35.7 l/p/d, with an organic load (BOD) of 11 g/p/d, and with a load of solids (TSS) of 11 g/p/d.
- Grey water from kitchen and food preparation premises (galley): 73.9 l/p/d, with an organic load (BOD) of 148 g/p/d, and with a load of solids (TSS) of 185 g/p/d.

Normally, only systems for treating black water are used on board of ships. As in ground plants, they involve the use of aerobic digestion—albeit on a small scale due to evident space limitations—which consists of the metabolisation of organic substances through micro-organisms, whose development is conditioned by the presence of oxygen.

This process requires a long time for the metabolisation and must function in continuous, with no possibility of being turned on or off on command depending on the needs. Furthermore, it also requires the presence of expert personnel for an appropriate management. Grey water and treated black water are stored in appropriate storage tanks for subsequent processing or disposal on land.

It would be desirable to provide a plant for treating waste water on board of vessels overcoming the limitations of the prior art, in particular a plant of suitably small size for direct treatment of black and grey water until satisfying the requirements for reuse and/or outboard discharge in terms of effluent quality, with minimum generation of biomass requiring a subsequent disposal on land. It would also be desirable to provide a plant capable of being turned on and off on command and requiring no chemicals for treatment.

SUMMARY OF THE INVENTION

Various aspects of the invention are set out in the accompanying claims.

Under one aspect, the invention relates to a plant for the treatment of waste water on board of vessels comprising one or more collection tanks receiving black water and grey water produced on board, a primary treatment unit comprising one or more band filters, a secondary treatment unit comprising one or several micro-filtration and/or ultra-filtration filters receiving the filtrate from the primary filtration unit, a tertiary treatment unit including at least one ozone treatment module receiving the filtrate from the secondary filtration unit, suitable for operating in continuous. In the context of the present specification, the term "collection tank" denotes a tank, usually operating under suction, adapted for receiving a waste water discharge and for continuously supplying the same to the primary treatment unit, with no intermediate storage step. The inventors have found that the combination of a band filter, a micro-filtration or ultrafiltration stage and an ozone treatment module is suitable for a reliable processing of all black water and grey water produced on board of vessels up to allowing either a subsequent outboard discharge of the effluent or a recycling thereof onboard as technical water (i.e. non-potable fresh water). This result is rather surprising, considering that the waste water collected on board and stored until subsequent processing or disposal on land in accordance with the teachings of the prior art is not at all suitable for being successfully treated by the same combination of units. Without wishing to be bound by any theory, it might be assumed that the storage of black and grey water even for a few days brings about changes in the composition of the matter to be treated, possibly due to reactions between different pollutants, imposing as a consequence more severe treatment conditions at a later stage. The immediate feeding of on board-produced waste water to the plant according to the invention has the advantage of providing a cheap, small-size and efficient treatment which may be put in operation at the time effluents are discharged into the collecting tanks and which involves no use of chemicals. In one embodiment, the tertiary treatment unit includes a reverse osmosis filter downstream the ozone treatment module, which can have the advantage of further enhancing the final quality of treated water at the plant outlet. In one embodiment, there are at least two collection tanks feeding the primary treatment unit continuously, one of which receiving only grey water from the kitchen and galley. The remaining grey water and the black water are in this case collected in one or more additional collection tanks. This can have the advantage of rationalizing the hydraulic connections on board of the vessel. In one embodiment for instance, the collection tank receiving grey water from the kitchen and galley is provided with a downstream oil separator, which has the advantage of facilitating the subsequent treatment in the primary treatment unit. Separating the collection tanks in this case has thus the advantage of feeding the oil separator with a limited amount of water, corresponding only to the water stream typically contaminated by oil residues, thus increasing the efficiency and decreasing the processing time and the size of the primary treatment unit. In one embodiment, all filters present in the plant are fully automated ans self-cleaning. In one embodiment, the primary treatment unit of the plant can remove TSS in amounts greater than 50% and the secondary treatment unit of the plant can remove TSS in amounts greater than 90%. A person skilled in the art can readily determine how to dimension the different units to achieve such values, which the inventors have found to be suitable for conveniently achieving the desired results in terms of total size and efficiency of the plant.

Under another aspect, the invention relates to a process of treatment of waste water produced on board of vessels in a plant as hereinbefore described comprising the steps of feeding black water and grey water from the collection tanks to the primary treatment unit where a band filtration takes place, feeding the relevant filtrate to the secondary treatment unit where a micro-filtration or ultra-filtration takes place, feeding the subsequent filtrate to the tertiary treatment unit where ozone treatment and optionally reverse osmosis filtration take place, all in a continuous cycle. In one embodiment, the treated water exiting the plant is sent to outboard discharge. In an alternative embodiment, the treated water exiting the plant is totally or partially recycled as technical water.

Some implementations exemplifying the invention will now be described with reference to the attached drawing, which has the sole purpose of illustrating the reciprocal arrangement of the different elements relatively to said particular implementations of the invention; in particular, drawings are not necessarily drawn to scale.

DETAILED DESCRIPTION OF THE DRAWINGS

Figure 1:
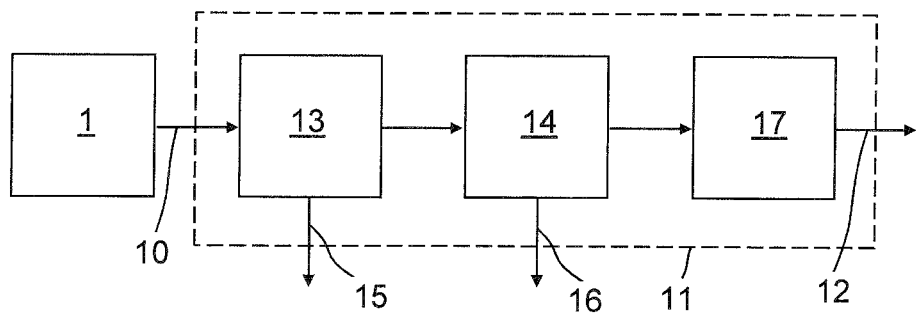
FIG. 1 schematically shows a plant for the treatment of waste water, in accordance with a first embodiment of the present invention.
Figure 2:
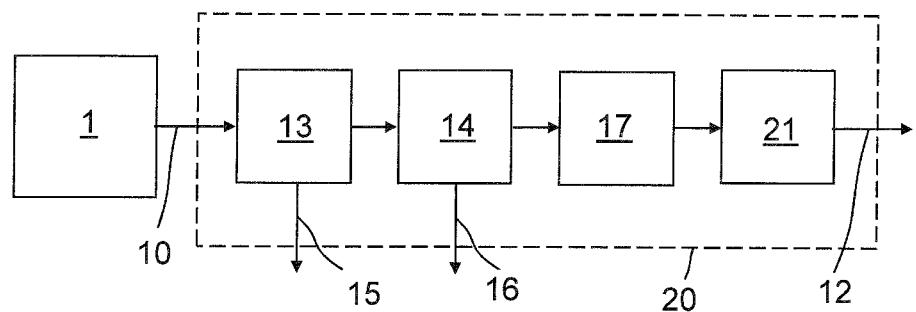
FIG. 2 shows schematically a plant for the treatment of waste water, in accordance with a second embodiment of the present invention.
Figure 3:
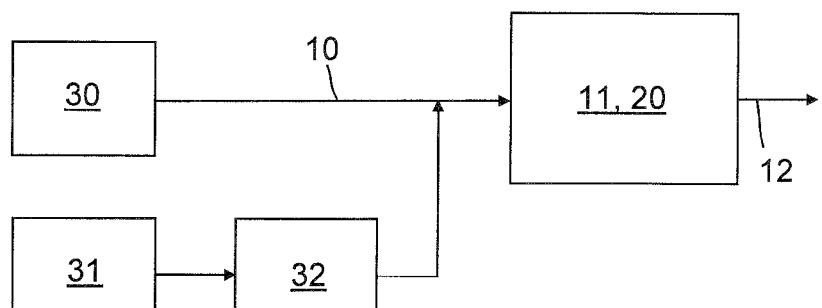
FIG. 3 schematically shows a plant for the treatment of waste water, in accordance with a third embodiment of the present invention.

Referring to the attached figures, a plant for waste water treatment installed on a cruise ship according to the first embodiment of the present invention comprises a collection tank 1 for temporarily receiving all waste water from the vessel. Waters collected in tank 1 are conveyed via pipe 10 to a treatment system 11. At the exit of the treatment system 11 a conduit 12 is present from which the treated water flows out, ready for discharging or delivery to a technical water tank (not shown).

Treatment system 11 comprises a primary treatment unit equipped with a band filter 13 which receives the waste water from tank 1, feeding the relevant filtrate to a secondary treatment unit comprising micro-filtration filter 14. Band filter 13 also includes an outlet for solids 15. Micro-filtration filter 14 also includes an outlet for solids 16. In an alternative embodiment, solids present at outlet 16 may be recycled to the inlet of filter 13 so as to provide treatment system 11 with outlet 15 as the only exit of solids.

Solids present at outlet 15 of filter 13 and solids present at outlet 16 of filter 14 are collected in order to be discharged.

The treated water coming from micro-filtration filter 14 is supplied to a tertiary treatment unit equipped with ozone treatment module 17 and including conduit 12 from which the treated water flows out.

A treatment plant of waste water according to a second embodiment of the present invention comprises, as in the previous case, a collection tank 1 for temporarily receiving all waste water from the vessel and is further equipped with treatment system 20.

The output of the tertiary treatment unit which includes ozone treatment module 17 is sent in this case to a reverse osmosis filtration unit 21. At the exit of filter 21, there is present conduit 12 from which the treated water flows out, ready for discharging. In a third embodiment of the present invention, waste water is split into two separate streams: waters coming from the kitchens and the galley are collected into a first collection tank 31, while black water and the remaining grey water are collected into a second collection tank 30.

The output of tank 30 is fed, through conduit 10, directly into the treatment system which can be a treatment system 11 according to the first embodiment or a treatment system 20 according to the second embodiment of the present invention.

The output of tank 31 is conveyed to an oil separator 32, whose output is fed back, via conduit 10, to treatment system 11 or 20.

EXAMPLES

The following examples of suitable embodiments are included to illustrate particular ways of reducing the invention to practice. It should be appreciated by those of skill in the art that the equipment, compositions and techniques disclosed in the following represent equipment, compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

The primary treatment unit equipped with band filter 13 is a crucial component for the success of an on board treatment plant for waste water. Unlike ground treatment plants, wherein black waters are largely diluted by rainwater and grey water, on board of passenger ships this flow is very concentrated because the collection system is made under vacuum, therefore using less transport water. Furthermore, the treatment is started immediately after collection, thus minimizing the phenomenon of pollutant dilution with water. By using a high performance filtration for this type of waste water there is the possibility to remove a large amount of COD and BOD5 since the pollutants are not yet fully and intimately dissolved in the transport water.

For avoidance of doubt, in the context of the present specification:
the term "COD" is used to denote Chemical Oxygen Demand; its value, expressed as milligrams of oxygen per litre ($mg_{O2}/l$), represents the amount of oxygen required for the complete chemical oxidation of organic and inorganic compounds present in a sample of water
the term "BOD5" is used to denote Biochemical Oxygen Demand, defined as the amount of O2 that is used in five days by aerobic microorganisms to decompose organic substances present in a litre of water or of aqueous solution in the dark and at a temperature of 20° C.

The inventors have found that filter 13 can be of the type such as that marketed by the company Salsnes Filter AS, under the name SF1000 or SF2000.

It consists of a device having a slanted endless filter band driven by a series of rollers inside a container in which waste water is forced to pass and having a portion which runs horizontally with the filtrate faced downwards. A blowing device, placed behind the filter band, blows air toward the filter band in order to remove the residues detached from the filter mesh, transported out by a screw conveyor placed below the blowing device.

Despite its small size, filter 13 is capable of processing water at a flow-rate of 10 l/s. It can remove TSS in an amount of 40 to 70%, normally higher than 50%, and BOD in an amount of 15 to 40%, normally higher than 20%, without using chemical products. This filter is completely automated.

For the secondary treatment unit, a self-cleaning cartridge filter such as those commercialized by companies Everblue and Filtrex can be used as the micro-filtration filter 14. The filtration degree of cartridges can range from 1 to 80 μm. The cartridges are cleaned in an automatic manner by means of pressurized water and the solids are retained on the outside of the cartridges.

Several filters of the same type can be added in series and in one successful reduction to practice of the present invention, three filters of this type have been used in series, with filtration degrees respectively of 80, 20 and 1 μm. A plurality of cartridges are present within each filter. Successful tests have also been carried out with a 20 μm micro-filter coupled to an Oltremare 750 kDa ultra-filtration module.

Filter 14 is capable of treating both black and grey water, obtaining a TSS reduction in an amount between 70 and 95% and normally greater than 90% for solids of size exceeding 25 μm, and a reduction of the COD in a quantity between 40 and 60% and normally higher than 50%.

The tertiary treatment unit includes a complete system for ozone treatment 17, such as the one provided by the company O. E. I. Ozono Elettronica Internazionale, designed so that the flow of water is put into contact with ozone along a conduit or vessel. Ozone at concentration of 2 to 4% by weight starting from air, or of 6 to 15% by weight starting from oxygen, is put into contact with the water to be treated by means of a system equipped with a Venturi pump.

The correct contact time is ensured by means of a conduit designed to accommodate the flow of water to be treated for a given period of time.

A UV light system can be placed downstream from the water/ozone contact system. This is to ensure the total absence of residual ozone dissolved in the water discharge before a discharge conduit 12.

Reverse osmosis unit 21, at low pressure, is a filter based on semi-permeable membranes, wherein water can flow across the membranes, but ions and larger molecules such as organic substances cannot pass.

Consequently, the fed waste water is separated into a stream of clean water (the permeate) and in highly concentrated a waste water (concentrate).

The reverse osmosis unit can also be used for removing heavy metals, such as copper, nickel, zinc, and residual nitrogen compounds. A membrane made of a composite film of polyamide and polysulphone can be used. The membrane can be cleaned in an automatic fashion.

Oil separator 32 can be the one commercialized by company FM Environmental Ltd. under the name Titan Class D10. This unit is subdivided into several parts and is capable of treating a flow-rate of 10 l/s. The device can remove up to 99% of fat matter (i.e. up to 72 kg of fats per hour). Waste water enters a diffuser and all large food particles are trapped in a primary filter (large solids). The solid-free waste water continues to flow into a main tank. The settled solids are periodically pumped through a secondary filter (small solids). Both small and large solids are collected in a tank. After supplying water to the main tank, fats, which are lighter than water, are separated under gravity and remain trapped. Oil separator 32 can be provided with an automatic cleaning system.

A pre-programmed removal cycle begins first with stirring the water by means of diffused air. This helps the further separation of suspended fat blocks and directs the waste to the discharge mechanism. The waste is then beaten and the fat melts. The liquefied fat is skimmed and transferred to external vessels.

Band filter 13 and micro-filtration filter 14 can remove TSS in amounts greater than 90%, hence at the inlet of ozone treatment module 17, TSS will be lower than 5%, making the ozone treatment very effective.

A particular feature of the treatment process as hereinbefore described is that the cycle is continuous. Waste water present in tanks 1, 30, 31 is sent directly to treatment plant 11 or 20 without allowing them to settle in the tanks.

In one working example of the present invention, wherein only grey water from the housings was supplied, the results reported in Table 1 were obtained. In the case of supply of black water only, the results reported in Table 2 were obtained.

TABLE 1

| Grey water from housings | Inlet water | After filter 13 | After filter 14 | After filter 17 |
|---|---|---|---|---|
| BOD5 (mg/l) | 200 | 100 | 40 | <15 |
| COD (mg/lO2) | 900 | 250 | 150 | <120 |
| TSS (mg/l) | 100 | 20 | 10 | <30 |
| Phosphorus - TDP (mg/l) | 10 | — | — | 1 |
| Silica (mg/l) | 2 | 2 | 2 | 2 |
| Chlorides (mg/l) | 20 | 20 | 20 | 20 |
| Iron (mg/l) | 1 | 2 | 2 | 0.2 |
| Copper (mg/l) | 3 | 3 | 3 | <0.0031 |
| Nickel (mg/l) | 1 | 2 | 2 | <0.0082 |
| Zinc (mg/l) | 2 | 2 | 2 | <0.081 |
| pH | 6-7.5 | 6-7.5 | 6-7.5 | 6-8.5 |
| E. Coli (CFU/100 ml) | | | | <5 |
| Faecal Coli (CFU/100 ml) | | | | <14 |

TABLE 2

| Black water | Inlet water | After filter 13 | After filter 14 | After filter 17 | After filter 21 |
|---|---|---|---|---|---|
| BOD5 (mg/l) | 2000 | 500 | 250 | <25 | <15 |
| COD (mg/lO2) | 4000 | 800 | 500 | <125 | <120 |
| TSS (mg/l) | 1500 | 230 | 30 | <35 | <30 |
| Nitrogen TKN (mg/l) | 800 | 400 | 280 | 230 | <10 |
| Phosphorus - TDP (mg/l) | 70 | 30 | 20 | 15 | 1 |
| Silica (mg/l) | 2 | 2 | 2 | 2 | 0.5 |
| Chlorides (mg/l) | 20 | 20 | 20 | 20 | 0.5 |
| Iron (mg/l) | 2 | 2 | 2 | 1.5 | 0.2 |
| Copper (mg/l) | 3 | 3 | 3 | 2 | <0.0031 |
| Nickel (mg/l) | 2 | 2 | 2 | 1.5 | <0.0082 |
| Zinc (mg/l) | 2 | 2 | 2 | 1.5 | <0.081 |
| pH | 6-8.5 | 6-8.5 | 6-8.5 | 6-8.5 | 6-8.5 |
| E. Coli (CFU/100 ml) | | | | | <5 |
| Faecal Coli (CFU/100 ml) | | | | | <14 |

The previous description shall not be intended as limiting the invention, which may be used according to different embodiments without departing from the scopes thereof, and whose extent is solely defined by the appended claims.

Throughout the description and claims of the present application, the term "comprise" and variations thereof such as "comprising" and "comprises" are not intended to exclude the presence of other elements, components or additional process steps.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:

1. A plant for the treatment of on board produced waste water comprising black water and grey water, while on board of vessels, comprising:
    a first collection tank is connected with a discharge of grey water from a kitchen and a galley produced on board and is configured to continuously receive and discharge the grey water from the kitchen and the galley, the first collection tank comprising a first output connected to an oil separator, wherein the grey water is conveyed to the oil separator comprising a third output; and
    a second collection tank is connected with a discharge of black water, the second collection tank comprising a second output;
    a primary treatment unit comprising a band filter, the third output and the second output connected to the primary treatment via a pipe, wherein both the grey water from the first collection tank and the black water from the second collection tank are treated collectively in the band filter;
    means for feeding a first filtrate obtained from said primary treatment unit to a secondary treatment unit comprising at least one micro-filtration or ultra-filtration filter; and
    means for feeding a second filtrate obtained from said secondary treatment unit to a tertiary treatment unit including at least one ozone treatment module,
    wherein the band filter is a device comprising a slanted endless filter band driven by a series of rollers inside a container in which the black water and grey water are forced to pass in a diagonal course on the slanted endless filter band and having a portion which runs horizontally with a filtrate faced downwards, and a blowing device placed behind the slanted endless filter band blowing air toward the filter band configured to remove residues detached from a filter mesh, transported out by a screw conveyor placed below the blowing device,
    wherein the plant is configured to concurrently treat on board produced waste water comprising black water and grey water fed to the plant while on board of vessels, and
    wherein said tertiary treatment unit further comprises at least one reverse osmosis filter downstream said at least one ozone treatment module.

2. The plant according to claim 1 wherein said first and second collection tanks operate under suction.

3. The plant according to claim 1 wherein all of said primary treatment unit, said secondary treatment unit, and said tertiary treatment unit, and said at least one reverse osmosis filter include automated and self-cleaning filters.

4. The plant according to claim 1 wherein said primary treatment unit can remove total suspended solids (TSS) in amounts greater than 50% and said secondary treatment unit can remove TSS in amounts greater than 90%.

5. A process of treatment of waste water produced on board of vessels in a plant according to claim 1 comprising:
    continuously feeding grey water from the kitchen and the galley of said first collection tank and black water from said second collection tank to said primary treatment unit, wherein both the grey water and the black water are treated collectively in the band filter to obtain the first filtrate;
    continuously feeding the first filtrate from said primary treatment unit to said secondary treatment unit to obtain the second filtrate; and
    continuously feeding the second filtrate from said secondary treatment unit to said tertiary treatment unit, in a continuous cycle.

6. The process according to claim 5, further comprising the additional subsequent step of onboard discharging the treated waste water.

7. The process according to claim 5, further comprising the additional subsequent step of recycling at least part of the treated waste water downstream said tertiary treatment unit as technical water.

* * * * *